United States Patent
Park et al.

(10) Patent No.: US 9,073,007 B2
(45) Date of Patent: Jul. 7, 2015

(54) SEPARATION MEMBRANE, HYDROGEN SEPARATION MEMBRANE INCLUDING THE SEPARATION MEMBRANE, AND HYDROGEN PURIFIER INCLUDING THE HYDROGEN SEPARATION MEMBRANE

(71) Applicant: SAMSUNG ELECTRONICS CO., LTD., Suwon-si, Gyeonggi-do (KR)

(72) Inventors: Hyeon Cheol Park, Hwaseong-si (KR); Kwang Hee Kim, Seoul (KR); Byung Ki Ryu, Hwaseong-si (KR); Jae Ho Lee, Yongin-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 105 days.

(21) Appl. No.: 13/767,971

(22) Filed: Feb. 15, 2013

(65) Prior Publication Data
US 2013/0206002 A1    Aug. 15, 2013

(30) Foreign Application Priority Data

Feb. 15, 2012 (KR) .................. 10-2012-0015318
Feb. 15, 2013 (KR) .................. 10-2013-0016184

(51) Int. Cl.
| | |
|---|---|
| *B01D 53/22* | (2006.01) |
| *B01D 71/02* | (2006.01) |
| *B21H 7/00* | (2006.01) |
| *C01B 3/50* | (2006.01) |

(52) U.S. Cl.
CPC ............... *B01D 53/228* (2013.01); *B21H 7/00* (2013.01); *B01D 2256/16* (2013.01); *B01D 71/022* (2013.01); *B01D 2325/02* (2013.01); *C01B 3/503* (2013.01); *C01B 2203/0405* (2013.01)

(58) Field of Classification Search
CPC ............... B01D 53/228; B01D 71/022; B01D 2256/16; B01D 2325/02; C01B 3/503; C01B 2203/0405; B21H 7/00
USPC ................... 96/4, 8, 10, 11; 95/55, 56; 502/4; 72/200
See application file for complete search history.

(56) References Cited

U.S. PATENT DOCUMENTS

| | | | |
|---|---|---|---|
| 3,350,846 A | 11/1967 | Makrides et al. | |
| 3,713,270 A * | 1/1973 | Farr et al. .......................... | 95/56 |
| 6,066,592 A | 5/2000 | Kawae et al. | |
| 6,461,408 B2 | 10/2002 | Buxbaum | |
| 6,585,033 B2 | 7/2003 | Nishida et al. | |

(Continued)

FOREIGN PATENT DOCUMENTS

| | | |
|---|---|---|
| EP | 1566457 A1 | 8/2005 |
| JP | 2000-159503 A | 6/2000 |

(Continued)

OTHER PUBLICATIONS

A. G. Knapton, "Palladium Alloys for Hydrogen Diffusion Membranes", Platinum Metals Rev., vol. 21 (2), 1977, pp. 44-50.

(Continued)

*Primary Examiner* — Jason M Greene
(74) *Attorney, Agent, or Firm* — Cantor Colburn LLP

(57) ABSTRACT

A separation membrane including an alloy wherein the alloy includes at least one Group 5 element and at least one Group 14 element, wherein the at least one Group 5 element and the at least one Group 14 element of the alloy define a body centered cubic structure.

14 Claims, 11 Drawing Sheets

(56) References Cited

U.S. PATENT DOCUMENTS

| | | |
|---|---|---|
| 6,800,392 B2 | 10/2004 | Jantsch et al. |
| 7,001,446 B2 | 2/2006 | Roark et al. |
| 7,468,093 B2 | 12/2008 | Aoki et al. |
| 2002/0058181 A1* | 5/2002 | Jantsch et al. ............ 429/44 |
| 2002/0062738 A1 | 5/2002 | Yoshida et al. |
| 2002/0157806 A1 | 10/2002 | Nishida et al. |
| 2004/0129135 A1* | 7/2004 | Roark et al. ............ 95/55 |
| 2005/0217480 A1 | 10/2005 | Aoki et al. |
| 2006/0016332 A1 | 1/2006 | Ma et al. |
| 2006/0174766 A1 | 8/2006 | Buxbaum |
| 2006/0213368 A1 | 9/2006 | Kita et al. |
| 2007/0056660 A1 | 3/2007 | Aoki et al. |
| 2007/0240566 A1 | 10/2007 | Benn et al. |
| 2008/0000350 A1* | 1/2008 | Mundschau et al. ............ 95/56 |
| 2008/0174040 A1 | 7/2008 | Saukaitis et al. |
| 2009/0056549 A1 | 3/2009 | Kita et al. |
| 2010/0092333 A1 | 4/2010 | Yamamura et al. |
| 2010/0247944 A1 | 9/2010 | Mleczko et al. |
| 2011/0038101 A1 | 2/2011 | Caumont et al. |
| 2011/0229379 A1 | 9/2011 | Way et al. |
| 2013/0136666 A1 | 5/2013 | Park et al. |
| 2013/0213228 A1* | 8/2013 | Ikeda et al. ............ 95/55 |

FOREIGN PATENT DOCUMENTS

| | | |
|---|---|---|
| JP | 2002-206135 A | 7/2002 |
| JP | 2003-001381 A | 1/2003 |
| JP | 2004-041591 A | 2/2004 |
| JP | 2004-167381 A | 6/2004 |
| JP | 2006-095521 A | 4/2006 |
| JP | 2006-283075 A | 10/2006 |
| JP | 2007-077445 A | 3/2007 |
| JP | 2009-226274 A | 10/2009 |
| JP | 2009-227487 A | 10/2009 |
| JP | 2011-072492 A | 4/2011 |
| KR | 1020110049707 A | 5/2011 |
| WO | 2007/078278 A2 | 7/2007 |
| WO | 2008111516 A1 | 9/2008 |

OTHER PUBLICATIONS

Fukai et al., "Diffusion of hydrogen in metals", Advances in Physics, vol. 34, No. 2, 1985, pp. 263-326.

H. Wipf, "Solubility and Diffusion of Hydrogen in Pure Metals and Alloys", Physica. Scripta. T94, 2001, pp. 43-51.

Hatlevik et al., "Palladium and palladium alloy membranes for hydrogen separation and production: History, fabrication strategies, and current performance", Separation and Purification Technology, 73, 2010, pp. 59-64.

Kwai S. Chan, "Alloying effects on fracture mechanisms in Nb-based intermetalic in-situ composites", Materials Science and Engineering, A329-331, 2002, pp. 513-522.

M.D. Dolan, "Non-Pd BCC Alloy membranes for industrial hydrogen separation", J. Membrane Science, vol. 362, pp. 12-28, 2010.

Nambu et al., "Enhanced hydrogen embrittlement of Pd-coated niobium metal membrane detected by in situ small punch test under hydrogen permeation", Journal of Alloys and Compounds, 446-447, 2007, pp. 588-592.

Nathan W. Ockwig et al., "Membranes for Hydrogen Separation", Chem. Rev., vol. 107, 2007, pp. 4078-4110.

S.A. Steward, "Review of Hydrogen Isotope Permeability Through Materials", Lawrence Livermore National Laboratory, Aug. 15, 1983.

Yun et al., "Correlations in palladium membranes for hydrogen separation: A review", Journal of Membrane Science, vol. 375, 2011, pp. 28-45.

* cited by examiner

SEPARATION MEMBRANE, HYDROGEN SEPARATION MEMBRANE INCLUDING THE SEPARATION MEMBRANE, AND HYDROGEN PURIFIER INCLUDING THE HYDROGEN SEPARATION MEMBRANE

This application claims priority to Korean Patent Application No. 10-2012-0015318, filed on Feb. 15, 2012, and Korean Patent Application No. 10-2013-0016184, filed on Feb. 15, 2013, and all the benefits accruing therefrom under 35 U.S.C. §119, the contents of which in their entirety are herein incorporated by reference.

BACKGROUND

1. Field

A separation membrane, a hydrogen separation membrane including the same, and a hydrogen purifier including the hydrogen separation membrane are disclosed.

2. Description of the Related Art

Pd-based metals are well known as membranes for selectively separating hydrogen gas from a hydrogen containing gas mixture. The Pd-based metal forms a face centered cubic; (FCC) unit cell and selectively permeates hydrogen by dissolution and diffusion of hydrogen through an interstitial space in the crystal lattice. However, the high unit cost of the Pd-based metal limits its commercialization.

Accordingly, there remains a need for a hydrogen separation membrane having a hydrogen permeability performance similar to the Pd-based metal and having a lower cost.

SUMMARY

An embodiment provides a separation membrane that may suppress hydrogen embrittlement fractures, has excellent oxidation stability, and has excellent hydrogen permeation characteristics.

Another embodiment provides a hydrogen separation membrane including the separation membrane.

Still another embodiment provides a hydrogen purifier including the hydrogen separation membrane.

According to an embodiment, disclosed is a separation membrane including: an alloy, wherein the alloy comprises at least one Group 5 element and at least one Group 14 element, and wherein the at least one Group 5 element and the at least one Group 14 element of the alloy define a body centered cubic crystal structure.

A lattice constant of the crystal structure of the alloy at room temperature may be about 98% to about 105% of a lattice constant of a crystal structure of a Group 5 element at room temperature.

The separation membrane may have a porosity of 0 to less than about 1 volume %.

The alloy may include the Ge in the content of about 0.1 to about 20 atomic %.

The alloy may further include at least one additional metal selected from Zr, Ti, Y, Ni, and Al.

The additional metal, the at least one Group 5 element, and the at least one Group 14 element may define a body centered cubic crystal structure.

The alloy may include about 0.1 to about 20 atomic % of Ge, and about 0.1 to about 30 atomic % of the additional metal.

The separation membrane may have a thickness of about 1 to about 500 μm.

According to another embodiment, a hydrogen separation membrane including the separation membrane is provided.

The hydrogen separation membrane may have hydrogen solubility (a ratio of H/M, wherein H represents moles of hydrogen atoms and M represents moles of a metal of the alloy) of about 0.2 to about 0.6, when measured at 0.1 to 1 MPa hydrogen pressure and at 400° C.

According to an embodiment, the hydrogen separation membrane may have hydrogen permeability of about $1.0 \times 10^{-8}$ to about $10.0 \times 10^{-8}$ mol/m*s*Pa$^{1/2}$ at 400° C.

The hydrogen separation membrane may further include a catalyst disposed on a side of the separation membrane.

The separation membrane and the catalyst layer may contact each other.

The catalyst layer may include at least one selected from Pd, Pt, Ru, and Ir, and at least one selected from Cu, Ag, Au, Rh, Ni, and Fe.

According to still another embodiment, there is provided a hydrogen purifier including: an inlet chamber comprising an inlet configured to receive a mixed gas including hydrogen; an outlet chamber including an outlet configured to output permeated hydrogen gas; and a hydrogen separation membrane, wherein the hydrogen separation membrane separates the inlet chamber and the outlet chamber.

According to an embodiment, the hydrogen separation membrane may have a tubular shape; a cylindrical chamber partition wall having a diameter greater than a diameter of the tubular hydrogen separation membrane contains the hydrogen separation membrane, the cylindrical chamber partition wall and the hydrogen separation membrane define the inlet chamber, and an inner surface of the hydrogen separation membrane may define the outlet chamber.

Also disclosed is method of preparing a separation membrane, the method including: heating at least one Group 5 element and at least one Group 14 element to form an alloy; and rolling the alloy to form the separation membrane.

Also disclosed is a method of purifying hydrogen, the method including: providing the hydrogen purifier; providing a hydrogen containing gas at the inlet of the hydrogen purifier; and diffusing hydrogen through the hydrogen separation membrane of the hydrogen purifier to purify hydrogen.

Since the separation membrane has excellent resistance to hydrogen embrittlement fractures while having an excellent hydrogen permeation characteristics, it may effectively improve durability, and a hydrogen separation membrane including the same may provide high purity hydrogen and have improved durability.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1A:
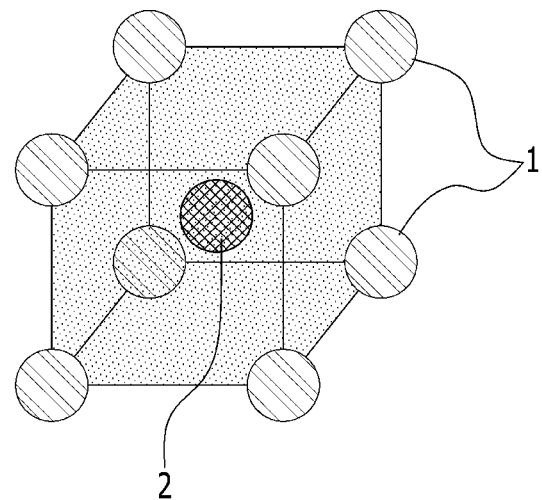
FIGS. 1A and 1B schematically show an embodiment of a crystal structure of a separation membrane.

This disclosure will be described more fully hereinafter in the following detailed description, in which some but not all embodiments of this disclosure are described. As those skilled in the art would realize, the described embodiments may be modified in various different ways, all without departing from the spirit or scope of this disclosure. These embodiments are provided so that this disclosure will be thorough and complete, and will fully convey the scope of the invention to those skilled in the art.

The size and thickness of each element shown in the drawings are not to scale and are provided for better understanding and ease of description, and this disclosure is not limited to that shown. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms "first," "second," "third," etc. may be used herein to describe various elements, components, regions, layers and/or sections, these elements, components, regions, layers, and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

According to an embodiment, a separation membrane including an alloy comprising at least one Group 5 element 1 and at least one Group 14 element 2 is provided. The separation membrane may be used as a separation membrane to selectively separate a specific gas. The separation membrane may be operated at a temperature which is higher than a suitable operating temperature of a polymeric separation membrane.

Greater than or equal to about 80 volume percent (volume %), specifically 80 to 99.999 volume %, more specifically 90 to 99.99 volume % of the alloy may have a body centered cubic crystal structure.

According to an embodiment, a hydrogen separation membrane including the separation membrane is provided. The hydrogen separation membrane can selectively separate only hydrogen gas from a gas mixture that comprises hydrogen gas, and the separation membrane has a high hydrogen permeation characteristic. While not wanting to be bound by theory, it is understood that the high hydrogen permeation characteristic of the separation membrane is because the alloy has a body centered cubic crystal structure, which may easily dissolve and diffuse hydrogen. Thus the hydrogen separation membrane may selectively separate hydrogen and provide high purity hydrogen, e.g., hydrogen having a purity of about 90 to 99.9999 volume %, specifically 98 to 99.999 volume %. For example, in the hydrogen separation membrane, greater than or equal to about 80 volume % of the alloy may have a body centered cubic crystal structure. The separation membrane having the alloy having the body centered cubic crystal structure in the above range may be useful as a hydrogen separation membrane.

The hydrogen separation membrane may be used for selectively permeating and separating $H_2$ gas from a gas that includes $H_2$, $CO_2$, and CO, such as a gas that is produced by steam reforming, coal gasification, a water gas shift reaction (WGS), and the like. For example, it may be used to provide a high purity hydrogen generator, a hydrogen regenerator for a fuel cell, a separation membrane for hydrogen separation of a mixed gas for a gasification combined thermal power plant, a separation membrane for $H_2/CO_2$ separation, and the like.

The separated hydrogen may be used for electric power generation by combustion of hydrogen to provide a clean energy source, or it may be used as a chemical raw material (e.g., for $NH_4$, or olefin synthesis) or for petroleum purification. In addition, since retentate gas after hydrogen removal comprises $CO_2$ at a high concentration, the $CO_2$ rich gas may be selectively collected, and optionally stored, to use for $CO_2$ removal.

While not wanting to be bound by theory, it is understood that the hydrogen separation membrane preferentially adsorbs hydrogen gas ($H_2$), and the adsorbed hydrogen gas ($H_2$) dissociates into hydrogen atoms (H) on the surface of the hydrogen separation membrane. The dissociated hydrogen atoms (H) can permeate through the separation membrane dissolving into the alloy and diffusing through the interstitial space in the tetrahedral or octahedral lattice of the separation membrane, thereby permeating through the membrane as is further disclosed in M. D. Dolan, J. Membrane Science 362, 12-28, 2010, the content of which in its entirety is herein incorporated by reference. The hydrogen atoms (H), which have permeated through the membrane, recombine to form hydrogen gas ($H_2$), which then desorbs from the hydrogen separation membrane, to provide separated (i.e., purified) hydrogen.

Figure 1B:
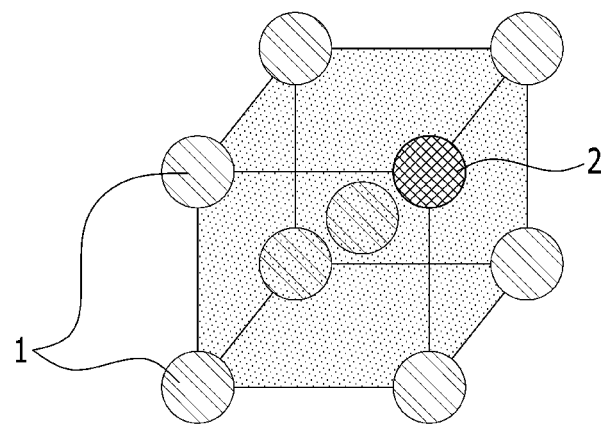

FIGS. 1A and 1B are schematic views of two of the types of crystal lattices that may be included in the separation membrane, showing a crystal lattice that may be formed by an alloy including at least one Group 5 element and at least one Group 14 element. The Group 5 element Nb and the Group 14 element Ge are specifically mentioned. A Group 5 element can form a body centered cubic structure. FIG. 1A shows an embodiment wherein the at least one Group 14 element is substituted in the center site of a body centered cubic structure formed by the Group 5 element, and FIG. 1B shows an embodiment wherein the at least one Group 14 element is substituted in the apex site of the body centered cubic structure formed by the Group 5 element. Namely, the separation membrane has a body centered cubic structure that is formed by the Group 5 element and the at least one Group 14 element together. The alloy may comprise a substitutional alloy. In an embodiment the alloy is a substitutional alloy.

The separation membrane may be a non-porous dense layer with porosity of less than about 1 to 0 volume %, specifically a porosity of about 0.9 to about 0.1 volume %, more specifically about 0.8 to about 0.2 volume %. Thus, the separation membrane may be a dense, non-porous layer. While not wanting to be bound by theory, it is understood that the non-porous properties of the separation membrane provide for selective separation of hydrogen because only hydrogen can permeate through the non-porous layer. If the separation membrane is used in a hydrogen separation membrane, it can be used in the form of a non-porous dense layer so as to selectively allow only hydrogen to permeate therethrough.

A separation membrane consisting only of a Group 5 element may form a metal hydride during hydrogen permeation and embrittlement may occur, which is referred to as "hydrogen embrittlement." Also, if external stress is applied to the embrittled part, a hydrogen embrittlement fracture may occur. To suppress the occurrence of or effectively prevent a hydrogen embrittlement fracture, hydrogen solubility may be reduced. While not wanting to be bound by theory, it is understood that the disclosed separation membrane (which comprises the at least one Group 14 element) has a hydrogen solubility which is less than that of a membrane consisting only of a Group 5 element. It is further understood that the covalent at least one Group 14 element strongly binds to the Group 5 element to lower the hydrogen affinity of the alloy, and the at least one Group 14 element may lower hydrogen solubility and suppress production of a metal hydride, which is a brittle phase. For example, since the Group 5 element Nb has a large lattice size, most added elements decrease the lattice size of Nb. To the contrary, addition of Ge to Nb often increases the lattice size of Nb. Considering only the lattice size, if a lattice size increases, a space where hydrogen may be dissolved increases and thus hydrogen solubility may be increased. If a hydrogen solution energy (e.g., in electron volts, eV) in a metal is calculated according to the lattice size by density functional theory (DFT), there is a tendency for hydrogen solution energy to increase as the lattice size increases. Also, DFT shows that if hydrogen is the nearest neighbor of Ge in the alloy, the absolute value of hydrogen solution energy decreases. Thus, DFT suggests that when a Group 14 element is alloyed with a Group 5 element, hydrogen affinity is largely lowered and production of a metal hydride is suppressed or effectively prevented. Therefore, and while not wanting to be bound by theory, it is understood that adding Ge decreases hydrogen affinity to improve brittleness resistance through suppression of production of the metal hydride without significantly decreasing hydrogen solubility, thereby providing improved hydrogen permeability.

The Group 5 element may be, for example, at least one selected from Nb, V, and Ta. The Group 14 element may be at least one selected from C, Si, Ge, Sn, and Pb, specifically at least one selected from Si, Ge, and Sn, more specifically at least one selected from Si and Ge.

If the at least one Group 14 element is alloyed with the Group 5 metal to form the crystal structures shown in FIG. 1A or 1B, the at least one Group 14 element may change the hydrogen solution energy so that the hydrogen solubility is reduced. The hydrogen solubility means the concentration of hydrogen dissolved in a metal, and is calculated as the mole ratio (H/M) of dissolved hydrogen atoms (H) to metal atoms (M), wherein the metal atoms are the at least one Group 5 metal and the at least one Group 14 metal.

In addition, if the at least one Group 14 element is alloyed with the at least one Group 5 element, a lattice constant may be increased, compared to a crystal lattice consisting only of a Group 5 element. Since a lattice constant of Ge, for example, is about 5.6 angstroms (A), which is larger than that of a Group 5 element, if it is alloyed with a Group 5 element a lattice constant of the alloy may be larger than that of the Group 5 element, but the magnitude of the change is less than that of a change to the lattice size when the alloy is formed by adding other elements, e.g., Ni, Fe, Mn, and the like. For example, a lattice constant of Nb, a Group 5 element, is about 3.3 Å. The alloy of the separation membrane may have a lattice constant of the crystal structure of about 3.2 to about 3.4 Å at room temperature (about 25° C.). Specifically, the alloy of the separation membrane may have a lattice constant of the crystal structure of about 3.22 to about 3.38 Å, more specifically, about 3.25 to about 3.35 Å. In another example, a lattice constant of a crystal structure of an alloy of V and Ge may be about 2.9 to about 3.2 Å, specifically about 2.95 to about 3.15 Å, more specifically about 3.0 to about 3.1 Å at room temperature (about 25° C.).

As is further explained above, since a lattice constant of a crystal structure is decreased very slightly or increased, the alloy may have improved hydrogen permeability while suppressing hydrogen embrittlement fractures. According to an embodiment, the alloy of the separation membrane may have a lattice constant at room temperature in the range of about 97% to about 105%, specifically about 98% to about 104%, more specifically about 99% to about 103% of the lattice constant of crystal structure of a pure Group 5 element at room temperature. As used herein, "a pure Group 5 element" is a Group 5 element which does not contain a Group 14 element.

If hydrogen solubility is reduced, hydrogen embrittlement may be suppressed but hydrogen separation performance may also be reduced because hydrogen permeability is simultaneously reduced. As is further explained above, although alloying at least one Group 14 element with at least one Group 5 element may reduce hydrogen solubility, it may also increase a lattice constant as compared to a crystal lattice formed only of a Group 5 element, and thus hydrogen permeability may be improved without undesirably reducing hydrogen solubility. Also, since the at least one Group 14 element has less hydrogen affinity than the Group 5 element, hydrogen embrittlement may also be effectively suppressed. Thus, since the separation membrane has improved hydrogen permeability and because hydrogen embrittlement is suppressed or effectively eliminated, it may be useful for a hydrogen separation membrane.

The content of the at least one Group 14 element in the alloy of the separation membrane may be selected without limitation so long as the desirable properties of the separation membrane are not adversely affected. Specifically, the alloy may include about 0.1 to about 20 atom %, specifically about 1 to about 15 atom %, more specifically about 5 to about 10 atom % of the at least one Group 14 element. The separation membrane including the at least one Group 14 element in the above range may have an excellent hydrogen permeation characteristics and simultaneously provide improved brittleness resistance. The separation membrane may provide useful properties and be suitable for use as a hydrogen separation membrane when an amount of the at least one Group 14 element in the foregoing range is included therein.

The separation membrane may further include an additional metal other than the Group 5 element and the at least one Group 14 element. The additional metal may be, for example, a 3-component alloy, a 4-component alloy, or a 5-component alloy. The additional metal may be at least one selected from Zr, Ti, Y, Ni, and Al. If the additional metal is further included, a ductility of the separation membrane may be increased. If the ductility of the separation membrane is increased, the increased ductility may further improve resistance to hydrogen embrittlement fracture.

The additional metal may also form a body centered cubic crystal structure together with the Group 5 element and the at least one Group 14 element in the alloy. Although a portion of the alloy further including the additional metal may form an intermetallic compound, most of the alloy may form a body centered cubic crystal structure, and thus greater than or equal to about 80 volume % of the alloy further including the additional metal may form a body centered cubic crystal structure.

If the separation membrane further includes the additional metal, the alloy included in the separation membrane may include about 0.1 to about 20 atom % of Ge and about 0.1 to about 30 atom % of the additional metal, specifically about 1 to about 10 atom % of Ge and about 1 to about 20 atom % of the additional metal.

As is further disclosed above, a hydrogen separation membrane comprising the separation membrane may have reduced hydrogen solubility, and specifically a hydrogen solubility ratio (i.e., a mole ratio of H/M, wherein H represents moles of hydrogen and M represents moles of metal atoms of the alloy) in a Nb alloy, when measured under a hydrogen pressure of 0.1 to 1 MPa and at 400° C., may be about 0.01 to about 0.70, and more specifically about 0.05 to about 0.65. More specifically, the hydrogen solubility, when measured under hydrogen pressure of 0.7 MPa (about 7 bar) and at 400° C., may be about 0.2 to about 0.6.

Further, a hydrogen separation membrane comprising the above disclosed separation membrane has improved hydrogen permeability. The hydrogen permeability may be calculated by the following equation.

$$\text{Permeability} = \text{solubility coefficient }(S) \times \text{diffusion coefficient }(D) \qquad \text{Equation 1}$$

The separation membrane may have hydrogen permeability of about $1.0 \times 10^{-8}$ to about $10.0 \times 10^{-8}$ mol/m*s*Pa$^{1/2}$ at 400° C., specifically about $2.0 \times 10^{-8}$ to about $5.0 \times 10^{-8}$ mol/m*s*Pa$^{1/2}$, and more specifically, about $3.0 \times 10^{-8}$ to about $5.0 \times 10^{-8}$ mol/m*s*Pa$^{1/2}$ (wherein mol refers to moles, m refers to meters, s refers to seconds, and Pa refers to pascals). The separation membrane may have a thickness of about 1 to about 500 micrometers (μm), and specifically about 10 to about 100 μm, more specifically about 20 to about 90 μm. When the separation membrane has a thickness in the foregoing range, it may have permeability suitable for use in a hydrogen separation membrane. The shape of the separation membrane is not limited, and may be in the shape of a sheet or in the shape of a tube. The thickness of the separation membrane may be the same as a thickness of a hydrogen separation membrane 23 of FIG. 3, or the same as a thickness of a tubular hydrogen separation membrane 33 of FIG. 4.

The separation membrane may be manufactured according to a known alloy manufacturing method without limitation, so long as the method provides an alloy that has the desirable properties disclosed herein. For example, the separation membrane may be manufactured by uniformly dissolving each metal by heating by arc melting, induction melting, and the like, and hot rolling and/or cold rolling to manufacture a membrane of a desired thickness.

Figure 2:
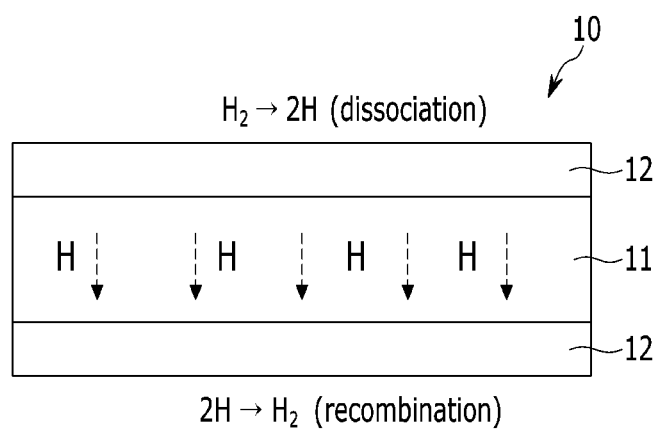
FIG. 2 schematically shows an embodiment of a mechanism for separating hydrogen in which hydrogen gas effectively passes through a hydrogen separation membrane.

The hydrogen separation membrane may further include a catalyst layer disposed on a side thereof. In an embodiment the catalyst layer is disposed on opposite sides of the hydrogen separation membrane. FIG. 2 shows a hydrogen separation membrane 10 wherein a catalyst layer 12 is disposed on opposite sides of the separation membrane 11, and schematically shows a mechanism by which hydrogen gas (H$_2$) passes through the hydrogen separation membrane. As is further described above, and while not wanting to be bound by theory, since hydrogen atoms permeate through the hydrogen separation membrane 10, dissociation of hydrogen molecules H$_2$ into hydrogen atoms (H) is understood to occur. The catalyst layer 12 may function as a catalyst for aiding the dissociation of hydrogen molecules. The hydrogen that passes through the hydrogen separation membrane 10 and is selectively permeated recombines to form hydrogen molecules, and the rate of recombination may be accelerated by the catalyst layer 12.

The catalyst layer 12 may comprise any material that may function as a catalyst for dissociation of the hydrogen molecules or recombination to form hydrogen molecules on the surface of the hydrogen separation membrane 10 without limitation, so long as the desirable properties of the hydrogen separation membrane are not adversely affected. The catalyst layer 12 may include at least one selected from Pd, Pt, Ru, and Ir, and may optionally further comprise at least one alloy selected from Cu, Ag, Au, Rh, Ni, and Fe.

The catalyst layer 12 may have a thickness of about 50 to about 1000 nanometers (nm), specifically about 100 to about 300 nm. When the catalyst layer 12 has a thickness in the above range, it may function suitably as a catalyst without significantly inhibiting permeability of the hydrogen separation membrane 10.

In the hydrogen separation membrane, the separation membrane 11 and the catalyst layer 12 may be formed so as to contact each other. In an embodiment, the catalyst layer 12 is disposed on the separation membrane 11. In an embodiment, since the hydrogen separation membrane has suitable hydrogen separation characteristics, it may consist only of the separation membrane 11 and the catalyst layer 12 without further including an additional layer to provide desired properties.

According to yet another embodiment, a hydrogen purifier including the hydrogen separation membrane is provided.

According to one embodiment, the hydrogen purifier may comprise an inlet chamber equipped with an inlet configured to receive a mixed gas including hydrogen gas, an outlet chamber including an outlet configured to output a separated hydrogen gas, and a hydrogen separation membrane, The hydrogen separation membrane is disposed between the inlet chamber and the outlet chamber and may be positioned so as to contact the inlet chamber on a first surface of the hydrogen separation membrane, and to contact the outlet chamber on an opposite second surface of the hydrogen separation membrane.

Figure 3:
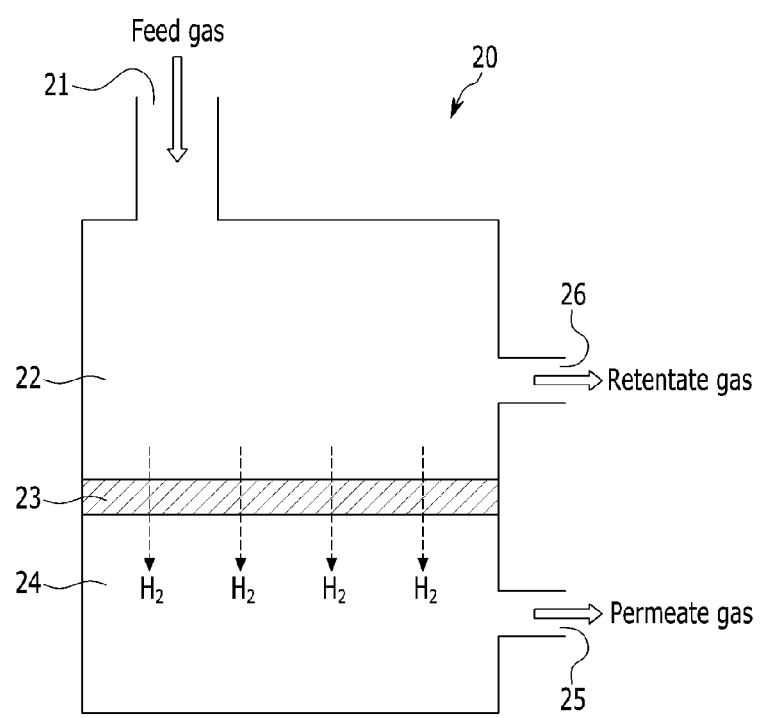
FIG. 3 is a schematic diagram of an embodiment of a hydrogen purifier.

FIG. 3 is a schematic view showing a hydrogen purifier 20 according to an embodiment. If a mixed gas which includes hydrogen is introduced into an inlet chamber 22 through an inlet 21, hydrogen is selectively separated and disposed into an outlet chamber 24 through the hydrogen separation membrane 23. The separated (e.g., permeated) hydrogen gas may be recovered through an outlet 25 of the outlet chamber 24. The hydrogen purifier 20 may further include a means 26 for recovering retentate gas after hydrogen is separated in the chamber. The hydrogen purifier 20 is shown in a simplified and schematic form for better comprehension and ease of description, and it may further include additional components according to the intended use.

Figure 4:
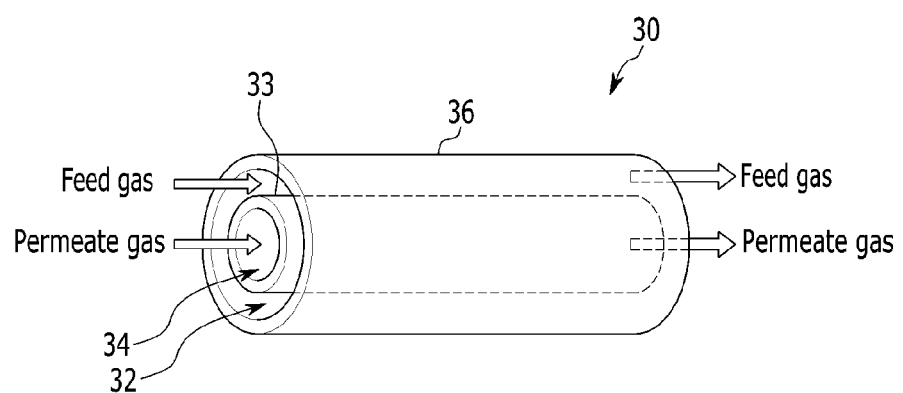
FIG. 4 is a schematic diagram of a hydrogen purifier including a tubular separation membrane.

FIG. 4 is a schematic view showing an embodiment wherein the hydrogen purifier 30 is formed in a tubular shape. The hydrogen purifier 30 includes a tubular hydrogen separation membrane 33, and a cylindrical chamber partition wall 36 having a diameter which is larger than a diameter of the tubular hydrogen separation membrane, and which is disposed outside of the tubular hydrogen separation membrane 33. The chamber partition wall 36 and the tubular hydrogen separation membrane 33 define a tubular inlet chamber 32. The inside of the tubular hydrogen separation membrane 33 defines a tubular outlet chamber 34 where hydrogen is output. The tubular inlet chamber 32 may be connected to a supply of a mixed gas which includes hydrogen gas (not shown) and a means for recovering retentate gas after hydrogen gas is separated (not shown). Also, the tubular outlet chamber 34 may be further equipped with a means for outputting the separated hydrogen gas.

According to yet another embodiment, a hydrogen purifier including a tubular hydrogen separation membrane 33 may be formed such that the mixed gas may be supplied inside the tubular hydrogen separation membrane 33, and the hydrogen may pass through the tubular hydrogen separation membrane 33 so that the separated hydrogen is disposed outside of the hydrogen separation membrane 33, opposite to the configuration shown in FIG. 4. Namely, the mixed gas is supplied to the inside of the hydrogen separation membrane 33, and the hydrogen is output to the outside of the hydrogen separation membrane 33.

Hereinafter, an embodiment is illustrated in further detail with reference to examples. However, the following are exemplary embodiments and shall not be limiting.

EXAMPLES

Example 1

Nb and Ge metal are uniformly melted in an arc melting furnace to form an alloy, thus manufacturing a hydrogen separation membrane consisting of a separation membrane having a thickness of 50 micrometers (μm). Specifically, Nb at 95 atom % and Ge at 5 atom % are weighed to prepare a material, the arc melting furnace is purged with Ar gas and then evacuated to a high vacuum ($5 \times 10^{-5}$ torr or less) to prevent oxidation. An electrical current is increased to melt the Nb and Ge, and then the resulting alloy is sufficiently cooled. To manufacture a membrane having a desired thickness, the material is cold rolled and annealed to manufacture a separation membrane, and then thin Pd layers are formed on both sides of the membrane by rf sputtering process to a thickness of 200 nanometers (nm) to manufacture a hydrogen separation membrane.

Example 2

A hydrogen separation membrane is manufactured by the same method as Example 1, except using a material prepared by weighing Nb at 90 atom % and Ge at 10 atom %.

Example 3

V and Ge metal are uniformly melted in an arc melting furnace to form an alloy, thus manufacturing a hydrogen separation membrane consisting of a separation membrane having a thickness of 50 micrometers (μm). Specifically, V at 95 atom % and Ge at 5 atom % are weighed to prepare a material, the arc melting furnace is purged with Ar gas and then evacuated to a high vacuum ($5 \times 10^{-5}$ torr or less) to prevent oxidation. An electrical current is increased to melt the V and Ge, and then the resulting alloy is sufficiently cooled. To manufacture a membrane having a desired thickness, the material is cold rolled and annealed to manufacture a separation membrane, and then thin Pd layers are formed on both sides of the membrane by rf sputtering process to a thickness of 200 nanometers (nm) to manufacture a hydrogen separation membrane.

Example 4

A hydrogen separation membrane is manufactured by the same method as Example 3, except using a material prepared by weighing V at 95 atom % and Si at 5 atom %.

Comparative Example 1

A hydrogen separation membrane consisting of pure Nb with a thickness of 50 μm is manufactured.

Comparative Example 2

A hydrogen separation membrane is manufactured by the same method as Example 1, except using a material prepared by weighing Nb at 95 atom % and Fe at 5 atom %.

Comparative Example 3

A hydrogen separation membrane is manufactured by the same method as Example 1, except using a material prepared by weighing Pd at 100 atom %.

Comparative Example 4

Only V metal is uniformly melted in an arc melting furnace, thus manufacturing a hydrogen separation membrane consisting of a separation membrane having a thickness of 50 micrometers (μm). Specifically, V at 100 atom % is weighed to prepare a material, the arc melting furnace is purged with Ar gas and then evacuated to a high vacuum ($5 \times 10^{-5}$ torr or less) to prevent oxidation. An electrical current is increased to melt the V, and then the resulting material is sufficiently cooled. To manufacture a membrane having a desired thickness, the material is cold rolled and annealed to manufacture a separation membrane, and then thin Pd layers are formed on both sides of the membrane by rf sputtering process to a thickness of 200 nanometers (nm) to manufacture a hydrogen separation membrane.

Experimental Example 1

Evaluation of Hydrogen Solubility

For the hydrogen separation membranes manufactured in Examples 1 and 2 and Comparative Examples 2 and 3, hydrogen solubilities are measured according to hydrogen pressure at 400° C. according to the JIS H7201 standard, and to evaluate hydrogen solubility, pressure-concentration-temperature (PCT) analysis is performed. In the following Table 1, hydrogen solubility under 0.7 MPa hydrogen is described.

Figure 5:
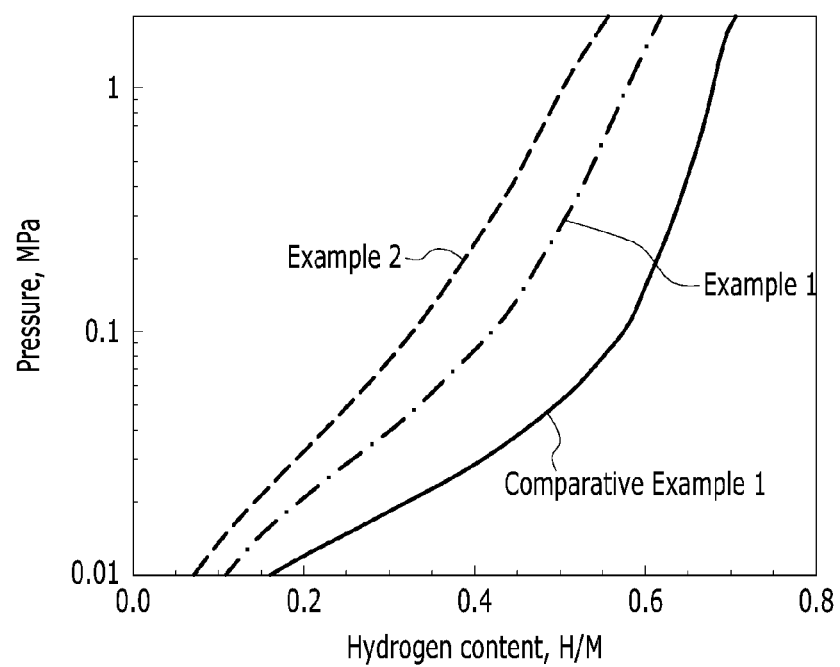
FIG. 5 is a graph of pressure (megaPascals, MPa) versus hydrogen content (hydrogen to metal atomic ratio, H/M) showing the results of pressure-concentration-temperature (PCT) evaluation of the hydrogen separation membrane manufactured in Examples 1 and 2 and in Comparative Example 1.

FIG. 5 is a PCT graph of Example 1, Example 2, and Comparative Example 1.

TABLE 1

|  | Example 1 | Example 2 | Comparative Example 2 | Comparative Example 3 |
|---|---|---|---|---|
| Hydrogen solubility (H/M) | 0.50 | 0.45 | 0.65 | −0.02 |

It is confirmed that hydrogen solubilities of Example 1 and Example 2 are lower compared to Comparative Example 2.

For the hydrogen separation membranes manufactured in Examples 3 and 4, hydrogen solubilities are measured according to hydrogen pressure at 400° C. according to the JIS H7201 standard, and to evaluate hydrogen solubility, pressure-concentration-temperature (PCT) analysis is performed.

Figure 8:
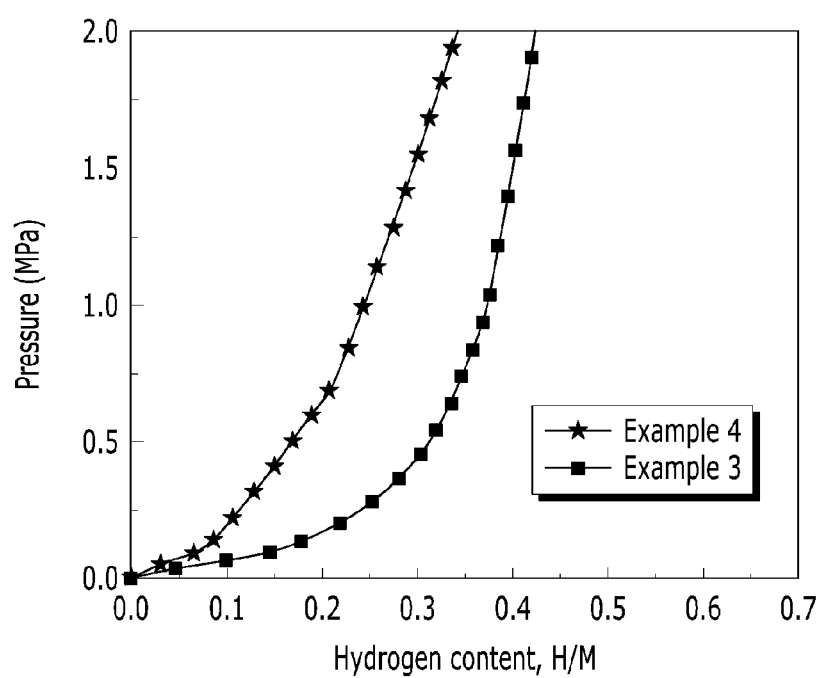
FIG. 8 is a graph of pressure (megaPascals, MPa) versus hydrogen content (hydrogen to metal atomic ratio, H/M) showing the results of pressure-concentration-temperature (PCT) evaluation of the hydrogen separation membrane manufactured in Examples 3 and 4.

FIG. 8 is a PCT graph of Examples 3 and 4.

As shown from FIG. 8, it is confirmed that hydrogen solubilities of Examples 3 and 4 are lower compared to that of Comparative Example 4 (H/M=0.55). The hydrogen solubility (H/M) of the membrane manufactured in Example 3 is 0.33 under 0.7 MPa (7 bar) hydrogen, and the hydrogen solubility (H/M) of the membrane manufactured in Example 4 is 0.21 under 0.7 MPa (7 bar) hydrogen.

Experimental Example 2

Figure 6:
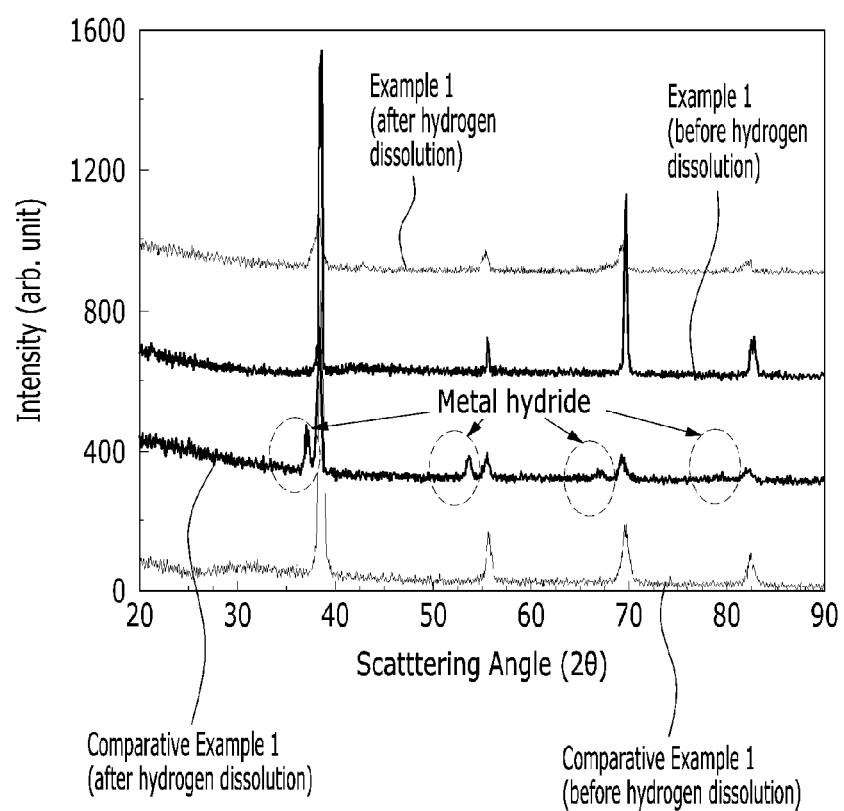
FIG. 6 is a graph of intensity (arbitrary units) versus scattering angle (degrees two-theta, 2θ) and is an X-ray powder diffraction (XRD) pattern of the hydrogen separation membranes manufactured in Example 1 and Comparative example 1 before and after hydrogen dissolution.

Evaluation of Stability of a Body Centered Cubic Structure and Formation of a Metal Hydride For the hydrogen separation membranes manufactured in Example 1 and Comparative Examples 1 to 2, after the hydrogen pressure is increased to 3 MPa, they are cooled to room temperature (about 25° C.) and X-ray diffraction analysis (XRD) is conducted to evaluate whether or not a peak corresponding to a metal hydride is produced, and the results are shown in FIG. 6. FIG. 6 shows the XRD analysis of the hydrogen separation membranes manufactured in Example 1 and Comparative Example 1. It is confirmed that in Example 1, a body centered cubic structure is maintained, and a metal hydride is scarcely generated even after hydrogen separation.

Also, a peak indicating the production of a metal hydride is confirmed in the hydrogen separation membrane of Comparative Example 1 (the XRD peaks are circled with dotted lines), and from the XRD analysis before hydrogen dissolution of the hydrogen separation membrane of Comparative Example 1, it is confirmed that the metal hydride does not exist before hydrogen dissolution.

Figure 9:
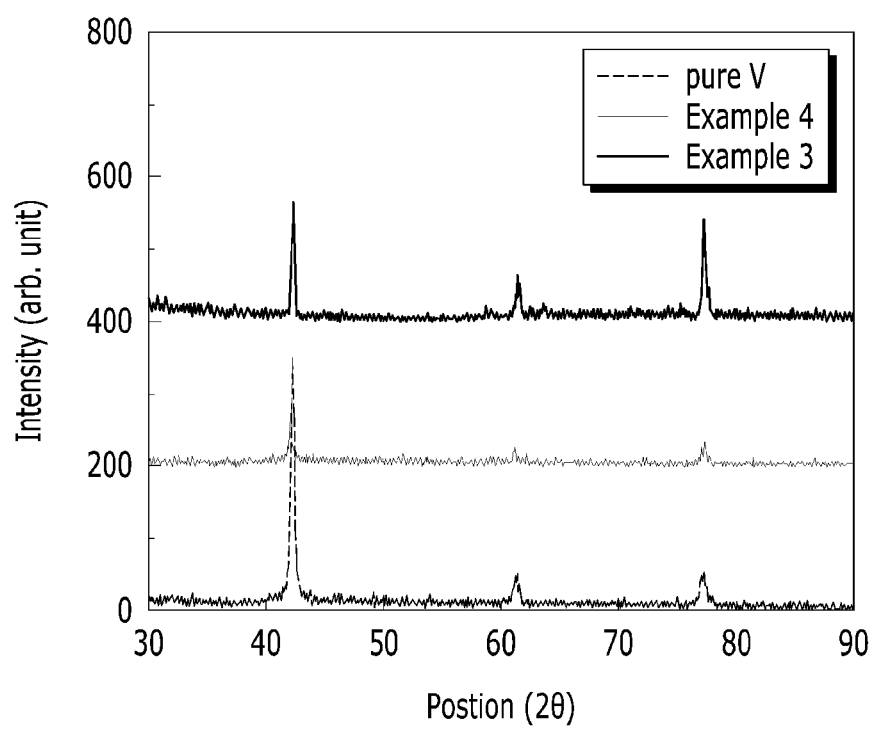
FIG. 9 is a graph of intensity (arbitrary units) versus scattering angle (degrees two-theta, 2θ) and is ah X-ray powder diffraction (XRD) pattern of the hydrogen separation membranes manufactured in Examples 3 and 4, and Comparative example 4 before and after hydrogen dissolution.

Further, for the hydrogen separation membranes manufactured in Examples 3 and 4, and Comparative Example 4, after the hydrogen pressure is increased to 3 MPa, they are cooled to room temperature (about 25° C.) and X-ray diffraction analysis (XRD) is conducted to evaluate whether or not a peak corresponding to a metal hydride is produced, and the results are shown in FIG. 9. FIG. 9 shows the XRD analysis of the hydrogen separation membranes manufactured in Examples 3 and 4, and Comparative Example 4. It is confirmed that in Examples 3 and 4, and Comparative Example 4, a body centered cubic structure is maintained.

Experimental Example 3

Evaluation of Lattice Size

Figure 7A:
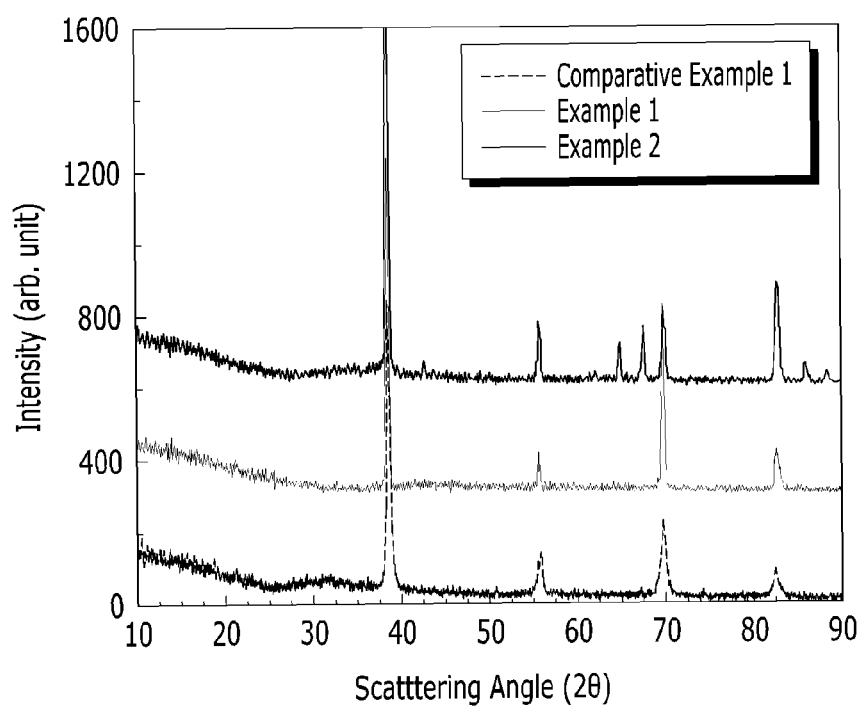
FIG. 7A is a graph of intensity (arbitrary units) versus scattering angle (degrees two-theta, 2θ) and is an X-ray powder diffraction (XRD) pattern of the hydrogen separation membranes manufactured in Examples 1 and 2 and Comparative example 1.
Figure 7B:
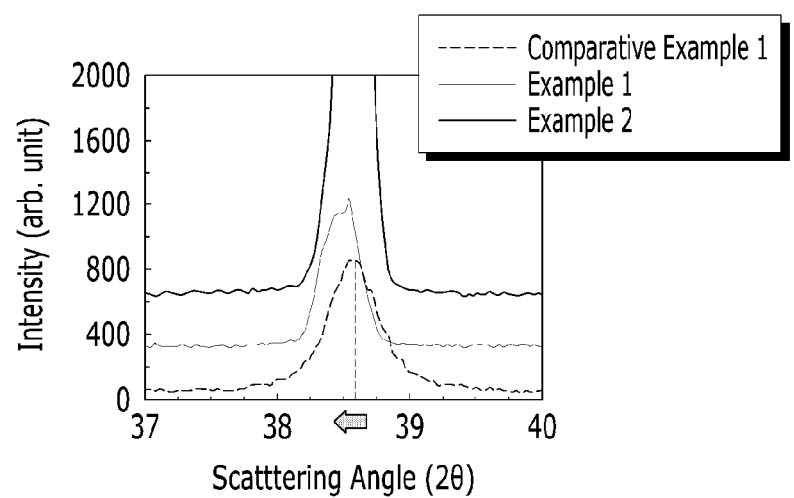
FIG. 7B is an enlarged view of the portion of FIG. 7A from 37 to 40 degrees two-theta.

For the hydrogen separation membranes manufactured in Example 1, Example 2, and Comparative Example 1, X-ray diffraction analysis (XRD) is conducted. FIG. 7A shows the XRD rests of Example 1, Example 2, and Comparative Example 1. FIG. 7B is an enlarged view of the maximum peak at 37 to 40 degrees 2θ. A crystal lattice size may be obtained from the XRD angle, and it can be seen that Example 1 and Example 2 have a value of 3.295 to 3.303 Å and thus the lattice size is not decreased or is increased compared to Comparative Example 1 (~3.295 Å).

Figure 10:
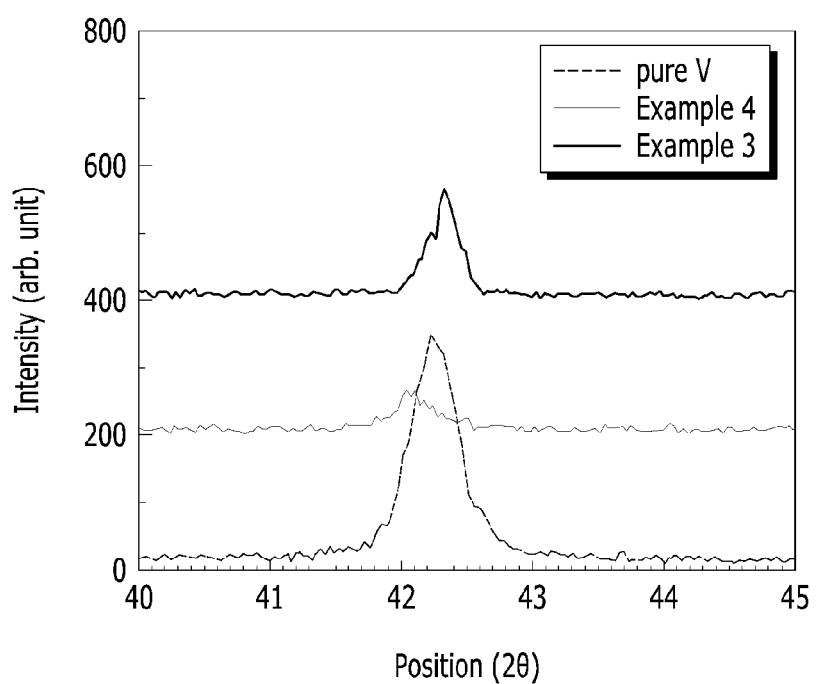
FIG. 10 is an enlarged view of the maximum peak at 41 to 44 degrees 2θ of FIG. 9, which shows the XRD results of Examples 3 and 4, and Comparative Example 4.

Further, FIG. 10 is an enlarged view of the maximum peak at 41 to 44 degrees 2θ of FIG. 9, which shows the XRD results of Examples 3 and 4, and Comparative Example 4. A crystal lattice size may be obtained from the XRD angle, and it can be seen that Example 3 and Example 4 have a value of 3.018 to 3.032 Å and thus the lattice size is not decreased or is increased compared to Comparative Example 4 (~3.021 Å).

Experimental Example 4

Evaluation of Hydrogen Permeability Characteristics

For the hydrogen separation membranes manufactured in Examples 1, 2, 3, and 4, and Comparative Examples 1 to 3, the hydrogen permeability coefficient (Permeability, $D_H \times S_H$) is calculated by the following Equation 2, on the basis of the above results. Herein, $(P_{H2,in})^{1/2}-(P_{H2,out})^{1/2}$ is a difference between the square roots of the hydrogen input partial pressure ($H_{2,in}$) and the hydrogen output partial pressure ($H_{2,out}$) of the hydrogen separation membrane.

$$\text{Flux}(J) = \frac{D_H \times S_H}{L} \times \left(\sqrt{P_{H_{2,in}}} - \sqrt{P_{H_{2,out}}}\right) \quad \text{Equation 2}$$

Herein, in the above Equation 2, Flux(J) is hydrogen permeability rate per unit area, L is a thickness of the hydrogen separation membrane, $D_H$ is a diffusion coefficient of hydrogen atoms, and $S_H$ is hydrogen solubility.

Hydrogen permeability results calculated by Equation 2 are described in the following Table 2. In Table 2, it is confirmed that Examples 1, 2, 3, and 4 have a much better hydrogen permeation characteristic than Comparative Example 3.

TABLE 2

| | Ex. 1 | Ex. 2 | Ex. 3 | Ex. 4 | Comp. Ex. 1 (Nb) | Comp. Ex. 2 (Nb—Fe) | Comp. Ex. 3 (Pd) |
|---|---|---|---|---|---|---|---|
| Hydrogen permeability ($\times 10^{-8}$ mol/m * s * Pa$^{1/2}$) | 5 | 4 | 6 | 5 | Fracture during measurement | Fracture during measurement | 1.6 |

"Ex" refers to Example, and
"Comp. Ex." refers to Comparative Example.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A separation membrane comprising:
   an alloy,
   wherein the alloy consists of 90 atomic % to 95 atomic % of at least one Group 5 element and 5 atomic % to 10 atomic % of at least one Group 14 element, wherein the at least one Group 14 element is Ge or Si, and
   wherein the at least one Group 5 element and the at least one Group 14 element of the alloy define a body centered cubic crystal structure.

2. The separation membrane of claim 1, wherein a lattice constant of the crystal structure of the alloy at room temperature is about 98% to about 105% of a lattice constant of a crystal structure of a Group 5 element at room temperature.

3. The separation membrane of claim 1, wherein the separation membrane has a porosity of 0 to less than about 1 volume %.

4. The separation membrane of claim 1, wherein the separation membrane has a thickness of about 1 to about 500 micrometers.

5. A hydrogen separation membrane comprising the separation membrane of claim 1.

6. The hydrogen separation membrane of claim 5, wherein the hydrogen separation membrane has a hydrogen solubility of about 0.1 to about 1, wherein the hydrogen solubility is a ratio of moles of hydrogen atoms to moles of a metal of the alloy and is measured at 0.1 to 1 megaPascals hydrogen pressure at 400° C.

7. The hydrogen separation membrane of claim 5, wherein hydrogen permeability is about $1.0 \times 10^{-8}$ to about $10.0 \times 10^{-8}$ mol/m*s*Pa$^{1/2}$ at 400° C.

8. The hydrogen separation membrane of claim 5, further comprising a catalyst disposed on a side of the separation membrane.

9. The hydrogen separation membrane of claim 5, wherein the separation membrane and a catalyst layer contact each other.

10. The hydrogen separation membrane of claim 9, wherein the catalyst layer comprises an alloy comprising at least one selected from Pd, Pt, Ru, and Ir, and at least one selected from Cu, Ag, Au, Rh, Ni, and Fe.

11. A hydrogen purifier comprising:
    the hydrogen separation membrane of claim 5;
    an inlet chamber comprising an inlet configured to receive a mixed gas comprising hydrogen; and
    an outlet chamber comprising an outlet configured to output permeated hydrogen gas,
    wherein the hydrogen separation membrane separates the inlet chamber and the outlet chamber.

12. The hydrogen purifier of claim 11, wherein
    the hydrogen separation membrane has a tubular shape,
    a cylindrical chamber partition wall having a diameter greater than a diameter of the tubular hydrogen separation membrane contains the hydrogen separation membrane,
    the cylindrical chamber partition wall and the hydrogen separation membrane define the inlet chamber, and
    an inner surface of the hydrogen separation membrane defines the outlet chamber.

13. A method of preparing a separation membrane, the method comprising:
    heating 90 atomic % to 95 atomic % of at least one Group 5 element and 5 atomic % to 10 atomic % of at least one Group 14 element to form an alloy consisting of 90 atomic % to 95 atomic % of at least one Group 5 element and 5 atomic % to 10 atomic % of at least one Group 14 element, wherein the at least one Group 14 element is Ge or Si; and
    rolling the alloy to form the separation membrane.

14. A method of purifying hydrogen, the method comprising:
    providing a hydrogen purifier according to claim 11;
    providing a hydrogen containing gas at the inlet of the hydrogen purifier; and
    diffusing hydrogen through the hydrogen separation membrane of the hydrogen purifier to purify hydrogen.

* * * * *